Dec. 7, 1965 E. J. JUSTUS ET AL Re. 25,927

DRYING DRUM AND METHOD

Original Filed April 10, 1957 2 Sheets-Sheet 1

Inventors
Edgar J. Justus
Robert A. Daane
by Hill, Sherman, Meroni, Gross & Simpson Attys

DRYING DRUM AND METHOD

Original Filed April 10, 1957 3 Sheets-Sheet 2

Inventors
Edgar J. Justus
Robert A. Daane
By Hill, Sherman, Meroni, Gross & Simpson Attys United States Patent Office Re. 25,927
Reissued Dec. 7, 1965

25,927

DRYING DRUM AND METHOD

Edgar J. Justus, Beloit, Wis., and Robert A. Daane, Palo Alto, Calif., assignors to Beloit Iron Works, Beloit, Wis., a corporation of Wisconsin Original No. 2,915,293, dated Dec. 1, 1959, Ser. No. 651,958, Apr. 10, 1957. Application for reissue Nov. 30, 1960, Ser. No. 72,826
9 Claims. (Cl. 165—1)

Matter enclosed in heavy brackets [ ] appears in the original patent but forms no part of this reissue specification; matter printed in italics indicates the additions made by reissue.

The instant invention relates to a dryer drum for a paper machine, and more particularly, to an improved dryer drum structure and in improved method of heating the dryer drum.

As conventionally employed in the art, dryer drums for paper machine drying sections generally consist of a cylindrical shell, spaced heads extending radially across the shell to close the open ends thereof and carrying means for journalling the shell for rotation, and means for introducing a heat exchange fluid into the interior of the shell. The Yankee dryer drum is a larger size of dryer drum than the ordinary paper dryers, but in most other respects is similar in structure. The instant invention has application in any type of dryer drum, but is particularly adapted for use in the Yankee dryer drum. In each case, these dryer drums (whether the large Yankee dryer drum or the smallest conventional drum) have certain operating limitations. The strength requirements for the shell define a minimum thickness therefor; and the greater the thickness of the shell the slower the heat transfer therethrough. Also, the higher the steam pressure within the shell, the greater the thickness required therefor. In view of this, there are definite limitations in shell size and usable steam pressures for any given shell, so that the maximum capcity for drying paper for a given shell is also limited.

As will be appreciated, a given shell structure can withstand only a certain maximum steam pressure and this maximum steam pressure which may be maintained within the shell determines the maximum amount of heat which can be supplied to the shell and thus the maximum amount of drying which can be effected by passing a paper web over the shell. For years these limitations have been recognized and the industry has continued to use certain standard dryer drum structures.

In contrast, the instant invention is based upon the discovery that certain heat exchange liquids at high temperatures may be used to yield greater rates of heat transfer without the high pressures obtained with condensing steam. Substantially non-volatile fluids, such as hot oil, may be used in direct contact with the inside of the dryer shell although it has been found that the transfer of heat to the shell is relatively slow unless the oil is in a state of highly turbulent flow. The invention is further based upon the discovery that a body of liquid in such a state may be effectively supplied with heat by the continuous uniformly distributed addition of a relatively small quantity of the same liquid at a considerably higher temperature while at the same time maintaining a nearly uniform temperature over the inner surface of the dryer shell.

In the practice of the instant invention the said body of liquid, hereinafter termed oil, is confined between the rotating shell and a stationary inner shell in the form of a thin annular turbulently flowing body. The movement of the rotating dryer drum shell relative to the stationary inner shell induces a state of highly turbulent flow unimpeded in its circumferential path at a velocity substantially equal to one half of the surface speed of the rotating shell. In order to maintain the temperature of the oil in the annularly flowing body (from which heat is being withdrawn through the shell to dry the web carried thereon) oil at a higher temperature is continuously added in a uniformly distributed manner through an orifice at a predetermined rate of flow. Oil is displaced from the annular body at the same rate and is reheated and recycled. This rate of flow is small, relative to the rate of flow of the main annular body of oil passing the orifice through which the high temperature oil is introduced. The oil in the annular body is under only relatively slight pressure and the shell of the dryer drum is correspondingly subjected to slight pressure so that the dryer drum shell may have a minimum thickness. This further facilitates the heating, and drying, of the web carried on the outer surface of the shell.

The oil displaced exits partly through an orifice similar to the aforesaid orifice, and in controlled part through chambers, adjacent to the enclosing heads of the rotating drum for the purpose of maintaining said heads at a temperature consistent with the operating temperature of the dryer drum shell.

It is, therefore, an important object of the instant invention to provide an improved dryer drum structure.

It is another object of the instant invention to provide an improved method of heating a dryer drum.

Still another object of the instant invention is to provide an improved dryer drum comprising a cylindrical shell, a head closing each end of the shell, means corotatably mounting said shell and said heads, an inner cylindrical shell mounted for close running relation to said cylindrical shell and heads, mean holding the inner shell against rotation, and means flowing a heat exchange fluid between said shells and withdrawing the fluid therefrom.

It is a further object of the instant invention to provide an improved dryer drum comprising means for confining a relatively thin annular body of heat transfer liquid and for inducing therein a state of highly turbulent circumferential flow, means for introducing an additional quantity of much higher temperature liquid into said body of liquid and means for reheating and recycling the liquid thereby displaced, and means for maintaining the dryer shell at a uniform temperature.

It is also an object of the instant invention to provide an improved dryer drum including means to control the flow of a heat exchange liquid adjacent to the heads thereof.

Other and further features, objects and advantages of the present invention will become apparent to those skilled in the art from the following detailed disclosure thereof and the drawings attached hereto and made a part hereof.

Figure 1:
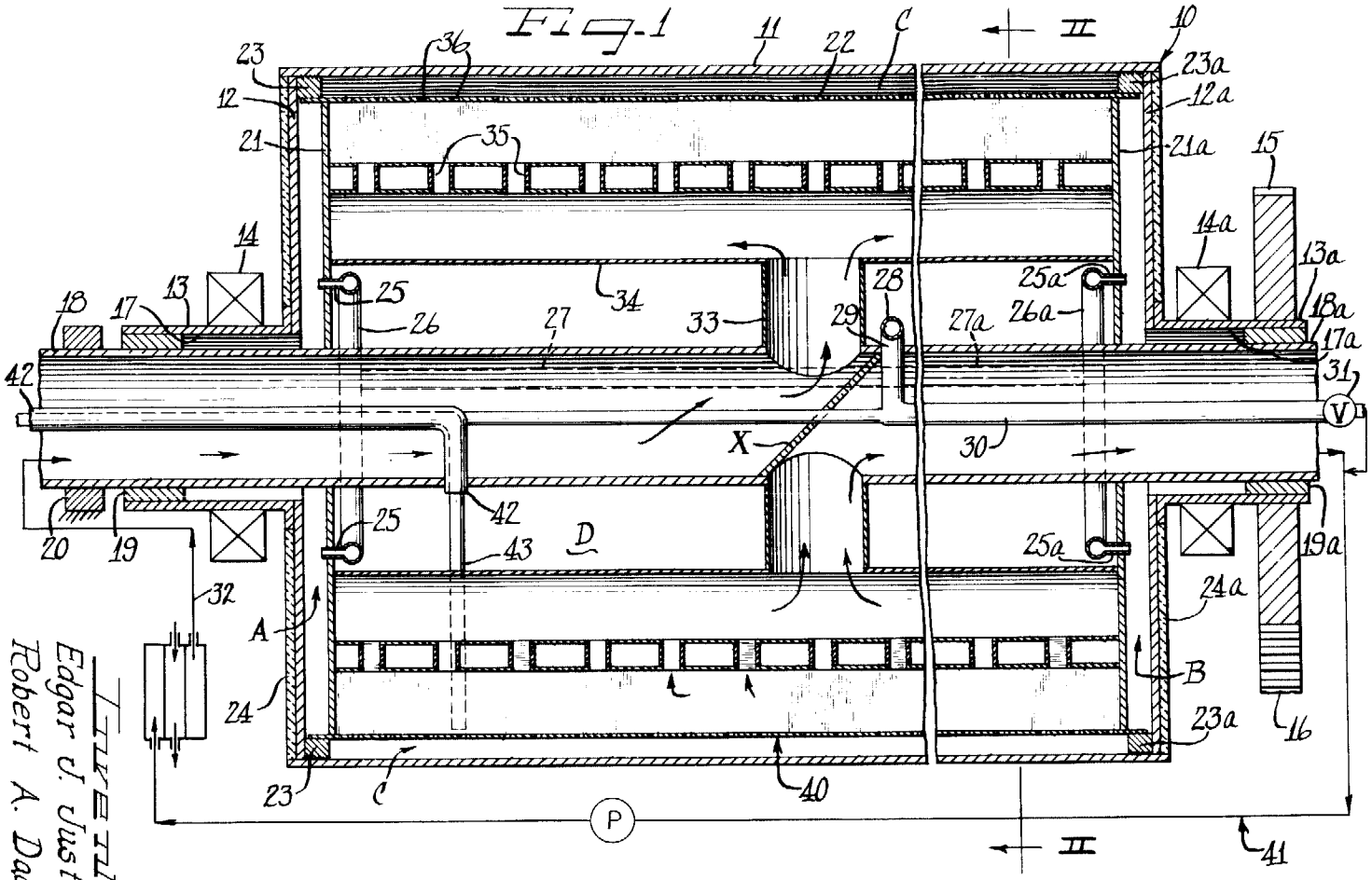
FIGURE 1 is essentially a diagrammatic view with parts shown in full and in sectional evelation taken generally along the longitudinal axis of rotation of a dryer drum of the present invention.
Figure 2:
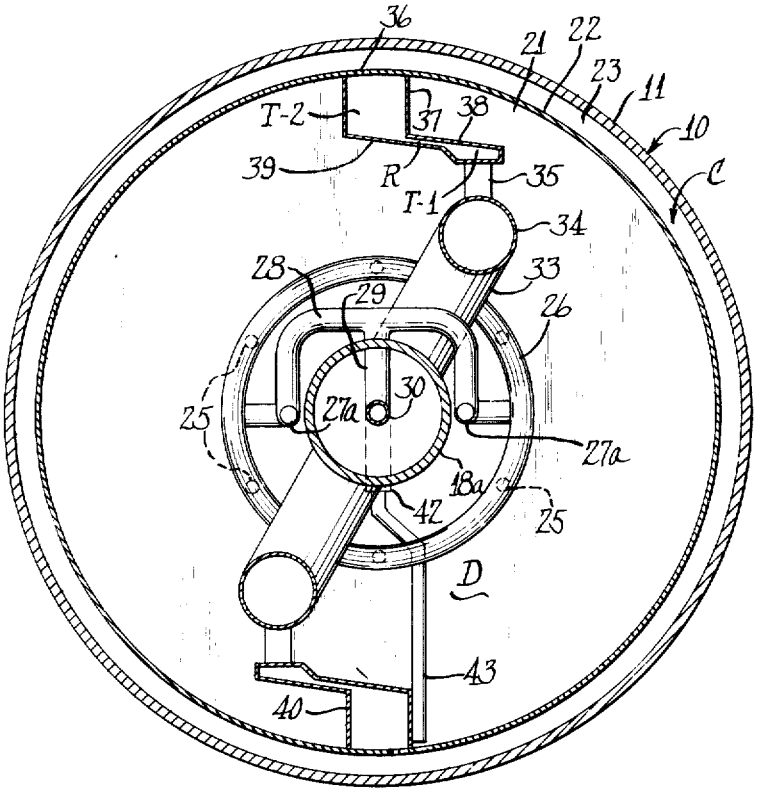
FIGURE 2 is a sectional elevational view taken substantially along the line II—II of FIGURE 1 (but showing the exact positioning of the elements rather than the generally diagrammatic view of FIGURE 1)

The reference numeral 10 indicates generally a dryer drum of the present invention. It will be noted that the sectional elevational view of FIGURE 2 shows accurately the positioning of certain conduits within the dryer drum 10, whereas the view of FIGURE 1 shows generally diagrammatically the various conduits within the dryer drum 10 for the sake of clarity. Deviations in the diagrammatic view of FIGURE 1 from the true arrangement shown in FIGURE 2 have been made to simplify the disclosure, as will be explained hereinafter.

The dryer drum 10 includes a cylindrical shell 11 having open ends closed by annular heads 12 and 12a bolted thereto and extending radially thereacross. Each of the annular heads 12 and 12a, respectively, has bolted thereto about its inner periphery an annular journal 13, 13a. The journals 13, 13a are rotatably carried in bearings shown diagrammatically at 14 and 14a, respectively. The bearings 14, 14a thus corotatably mount the journals 13, 13a, the heads 12, 12a and the shell 11. A gear 15 corotatably mounted on the journal 13a and driven by a drive gear 16 (shown partially) provides the drive means for rotating the shell 11 at the speed desired and in the direction desired for the operation of the paper machine.

It will be appreciated that the heads 12, 12a and the journals 13, 13a are not shown in their actual dimensions for purposes of simplification, but it will be noted that each of the journals 13, 13a is provided with an axially extending bore 17, 17a. The bores 17, 17a receive concentric conduits 18, 18a, respectively. The concentric conduits 18, 18a extend into the shell 11 in the form of a single conduit divided by a baffle plate X which separates the conduits 18, 18a. Packing glands 19, 19a provide oil seals between the journal 13 and conduit 18 and the journal 13a and conduit 18a, respectively. The conduits 18, 18a are held against rotation, as by a fixed support 20.

Heads 21, 21a are mounted just inside of and closely spaced from the heads 12, 12a. The heads 21, 21a are secured to the conduits 18, 18a by suitable means (not shown) such as welds. The heads 21, 21a mount an inner shell 22 that is closely spaced from the outer dryer drum shell 11 so as to define therewith an annular chamber C. The heads 12 and 21 also define therebetween a generally annular chamber A; and the heads 12a and 21a define therebetween a generally annular chamber B. The chambers A and B are "head" chambers whereas the chamber C is a peripheral chamber.

It will be appreciated that the inner shell 22 and the heads, 21, 21a are held against rotation by the fixed conduits 18, 18a, but the inner shell is mounted for close running relation to the outer shell 11 and the inner heads 21, 21a are mounted for close running relation to outer shell heads 12, 12a. The chambers thus formed, namely the peripheral chamber C and the head chambers A and B (which include the space within the journals 13, 13a outwardly to the seals 19, 19a) are initially filled with the before-mentioned oil, in any suitable manner, such as by the recirculating flow to be described. Additional oil, at a suitably higher temperature is then urged, by pump means P, into the chamber C by conduit means which will be described. Oil is displaced from the chamber C at the same rate, part of which is permitted to flow into the head chambers A and B past the flow restriction means in the form of packing strips 23, 23a mounted adjacent to the heads 12, 12a and between the shells 11 and 22. Packing strips 23, 23a do not sealingly engage the inner wall of shell 11, or the heads 12, 12a but permit a small flow of liquid into the head chambers. This flow passes out of the dryer by means which will be described. This is advantageous, because it is desired to maintain the heads 12, 12a at a high temperature. The hot oil in the chamber C heats the shell 11 so as to cause the same to expand to an appreciable extent. The heads 12 and 12a must also expand a corresponding amount in order to maintain secure and sealing engagement between the heads 12, 12a and the shell 11. For this reason, it is generally preferable to mount an insulating material 24, 24a against the outside of the heads 12, 12a to prevent cooling thereof. The insulating material 24, 24a may be any suitable layer of refractory heat insulation, such as compacted asbestos, glass fiber, etc., which is secured to the outside of the heads 12, 12a by any suitable means (not shown) which include adhesive or nut and bolt assemblies, if an insulating board material is used.

Also, the temperature of the heads 12, 12a is controlled by the flow of hot oil past the packing strips 23, 23a and through the head chambers A and B. A plurality of bleed-off lines 25, 25a afford communication between the head chambers A, B and conduit rings 26, 26a respectively. As is best shown in FIGURE 2, the conduit ring 26 forms a complete circle and the bleed-off lines 25 are peripherally spaced around the circle. The rings 26, 26a feed oil through generally longitudinally extending conduits 27, 27a into a centrally positioned arcuate conduit 28.

As shown in FIGURE 1, the conduits 27 and 27a extend from adjacent the heads 21, 21a longitudinally to the arch-shaped conduit 28 at approximately the middle of the roll 10. As shown in FIGURE 2, the ring 26 has a pair of longitudinally extending conduits 27, 27a which lie in the same plane as the center line of the roll 10. (For simplification the conduits 27 and 27a are shown offset from the center line of the roll 10 in FIGURE 1, so that their function may be apparent in FIGURE 1.) The arcuate conduit 28 feeds downwardly through a short conduit 29 into an axially aligned conduit 30 concentrically mounted within the oil outlet conduit 18a so that the oil may flow through the conduit 30, as controlled by a valve 31, out of the roll 10. The valve 31 thus controls the rate of flow of oil through the head chambers A and B. The rate of flow of oil through the head chambers A and B, of course, materially affects the temperature of the heads 12 and 12a (as well as the heads 21, 21a which must also form a firm seal with the shell 22). In this way, the desired temperature in the heads 12 and 12a may be maintained.

Figure 3:
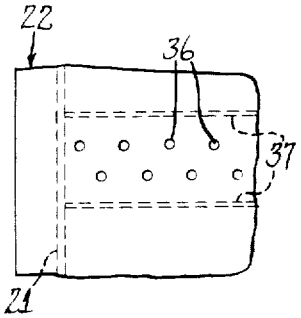
FIGURE 3 is a fragmentary top plan view of an inner shell structure adapted for use in the invention.

Referring now to the flow of oil in and out of the peripheral chamber C, it will be noted that the additional flow of high temperature oil feeds from a heat exchanger (shown diagrammatically at 32) into the main conduit 18 and from there through a short pipe connection 33 radially outwardly into a longitudinally extending header 34 (as indicated by arrows). As shown in FIGURE 2, the pipe connection 33 extends radially at an angle offset from the vertical as it feeds into the circular header 34. The header 34 extends the full distance between the heads 21 and 21a. From the header 34 the hot oil feeds radially outwardly through a plurality of longitudinally spaced openings or pipes 35, then through a first right angle turn T–1, next through a reduced cross-sectional area R and then through a second right angle turn T–2 (as shown only in FIGURE 2). From the second right angle turn T–2 the hot oil flows radially outwardly through an orifice, in this case defined by a drilled area on the surface of the shell 22. The orifice may also be an elongated slot, but preferably it is a drilled area as shown in FIGURE 3. In FIGURE 3, it will be noted that the shell 22 is provided with a plurality of drilled holes therein, indicated by the reference numeral 36. The final conduit portion 37 feeds hot oil through the holes 36. As indicated in FIGURE 2, the final conduit portion 37 receives the hot oil after the second right angle turn T–2.

The pipes 35 feed hot oil at high speed against a baffle 38 (FIGURE 2) so as to effect the first right angle turn T–1 in the oil flow. Next, the baffle 38 converges with a floor portion 39 of the conduit to form a restricted cross-sectional area R. The effect of the first right angle turn is to impinge the oil against the baffle 38 so that the oil flowing in small individual streams (through the pipes 35) at a high rate of speed will spread out laterally in the conduit. The restricted cross-sectional area between the baffle 38 and the conduit floor portion 39 also serves to spread the oil out laterally so that a more uniform flow rate of oil is obtained throughout the lateral dimension of the conduit.

The hot oil is then passed through a second right angle turn T–2 as it enters into the final conduit portion 37 and from there the oil passes through the drilled holes 36 in the periphery of the shell 22, and is thoroughly and uniformly intermixed with the circumferentially flowing (due to the rotation of the outer shell 11) body of oil in the peripheral or annular chamber C, so that the said body of oil is continuously reheated as it passes this point without bringing the very high temperature of the entering oil into direct contact with the shell 11. As previously mentioned, a portion of the displaced oil is permitted to flow past the packing rings 23, 23a, but the remainder of the displaced oil flows out through a bottom outlet indicated generally by the reference numeral 40. The outlet conduit 40 has a symmetrical configuration to the inlet conduit system 33, 34, 35, 37, 38 and 39, so that the outlet conduit 40 need not be described in further detail. However, a drilled area in the shell 22 also is employed in the outlet 40 so as to control the flow of oil from the chamber C into the outlet 40. From the outlet 40, the oil flows, as indicated by the arrows shown in FIGURE 1, into the central outlet conduit 18a and from there through a piping system indicated generally by the reference numeral 41, where it is rejoined with the flow exiting from control valve 31 (shown in straight lines) through the pump P, into the heat exchanger 32.

As will be appreciated, the inner shell 22 is mounted on the central conduit 18, 18a by the desired number of spaced supports (not shown) which may be required for strength, but the general configuration of such supports is the same as that of the heads 21, 21a. Also, the heads 21, 21a form with the shell 22 and central conduit 18, 18a a closed chamber (indicated at D in FIGURE 2) wherein oil may seep and gas pressures may vary due to heating and cooling of the dryer drum 10. A vent 42 affords communication between the chamber D and the atmosphere. As indicated in FIGURE 1, the vent 42 extends concentrically through the conduit 18 from the chamber D (extending from the chamber D outwardly along the middle of the conduit 18 to the atmosphere). Concentrically mounted within the vent 42 is a drain line 43. The drain line 43 extends radially outwardly to close proximity with the inner periphery of the shell 22 for the removal of any oil leaking into the chamber D and collecting therein.

From the foregoing, it will be seen that the instant invention embodies a method of heating a rotating dryer drum shell 11, which comprises confining a body (in chamber C) of non-volatile heat exchange liquid between the inside of the shell 11 and a closely spaced stationary surface 22 to effect turbulence in the liquid, forcing a predetermined amount of hot liquid into this body and withdrawing an equal amount of spent liquid from the body.

The following advantageous features are characteristic of the invention:

(1) The uniformity of drying across the sheet depends only on the uniformity of the introduction rate of oil across the width and this is the basic reason for the orifice, preferably the series of drilled holes across the inner stationary shell.

(2) The change in temperature around the circumference does not affect the uniformity of drying of paper since each point on the dryer shell experiences the same temperature cycle.

(3) The change in temperature around the circumference can be kept small, the advantage in this being that for a given drying rate the thermal stress and the resultant distortion of the shell is minimized, the more uniform the temperature of the oil is in the annular space. (The thermal stresses due to temperature differentials through the shell limit the thickness of the cast iron shell.) This small temperature variation derives from the fact that the volume flow of oil in the annular space between the dryer shell and the inner drum is high enough so that the heat to be removed from it, making one pass around the dryer, results in only a small temperature drop. This desirable situation stems from the discovery that for dryer shell speeds in the range of interest (2500 to 4000 f.p.m.), the depth of the annular space can be made large enough to result in the high volume of flow and at the same time small enough to result in adequate convection turbulence for the high heat transfer rate from the oil to the dryer shell.

(4) The quantity of hot oil which must be pumped into and out of the dryer is dictated by the drying rate and by the amount by which the temperature of the oil introduced exceeds that of the oil removed. Thus the quantity of oil pumped into and out of the dryer can be kept relatively small if it is introduced at a high temperature, say 50 to 100° F. higher than the oil in the annular space. This high temperature excess of the oil introduced does not, in the proposed invention, result in high temperature or high temperature differences being imposed on the dryer shell, because the introduced oil is immediately mixed upon entering the annular space with a larger quantity of relatively cooler oil in the annular space. This mixing is complete before any of the hot oil introduced comes into contact with the dryer shell. The advantages of using high oil inlet temperatures and the consequently smaller rate of introduction are as follows:

a. Reduced pumping load.

b. Reduced size of piping and associated fittings.

c. Reduced velocity of oil in the inlet and outlet piping flow channels, making it easier to control the uniformity of delivery across the dryer width.

The invention may be illustrated by an example:

Heat required to be supplied at 30,000 B.t.u./hr. sq. ft. (per ft. of dryer width). An annular space of 2″ (equals $\frac{2}{12}$ ft.). A dryer surface speed of approx. 3000 ft. min. The volume of oil circulating within the annulus is then:

$$\left(\frac{3000+0}{2}\right)\text{ ft./min.}\times\left(\frac{2}{12}\right)\text{ ft.}\times(1)\text{ ft.}=250\text{ c.f.m.}$$

This quantity of circulating oil is reduced in temperature in its passage around the annulus (in a 12 ft. dia. dryer) by an amount as follows:

$$\frac{30{,}000\text{ B.t.u./hr./ft.}^2\ \frac{\times 1}{60}\times 12}{250\text{ ft.}^3\text{/min.}\times 0.6\text{ B.t.u./lb./DEGF}\times 46\text{ lb./ft.}^3}$$

$$= \text{Dt2}=2.7^\circ\text{ F.}$$

The temperature of the oil (specific heat 0.6 and density 46) introduced to the dryer is 50° F. above the nominal temperature of the oil in the annulus, so the following quantity is required:

$$\frac{30{,}000\times 12}{60\times 50^\circ\text{ F.}\times 06\times 46}=\text{W}=13.6\text{ c.f.m.}$$

The oil is preferably added at a rate such that the flow of liquid past a given point on the shell is more than twice the volume introduced into such liquid. The spacing between the shells 11 and 22 is preferably about 2″ in the case of the heat transfer oils now available, but may range from a minimum of 1″, which is determined from the heat capacity of the total annular volume of liquid, to a maximum of 10″, which in turn is determined from the heat transfer characteristics of the liquid.

It will be understood that modifications and variations may be effected without departing from the spirit and scope of the novel concepts of the present invention.

We claim as our invention:

[1. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, and a drainage line communicating with said second orifice means and leading through one of said heads.]

[2. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, a drainage line communicating with said second orifice means and leading through one of said heads, and a heater for said fluid receiving the fluid from the drainage line and feeding it into the inlet line.]

[3. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, first and second orifice means in said first shell, said orifice means being in peripherally spaced relation and extending throughout the length of the roll, said inlet line feeding fluid through said first orifice means into said chamber, and a drainage line communicating with said second orifice means and leading through one of said heads.]

[4. A method of heating a rotating dryer drum shell, which comprises confining an annular body of non-volatile heat exchange liquid between the inside of the shell and a closely spaced stationary surface to effect turbulence in the liquid, forcing a predetermined amount of hot liquid into said body and withdrawing an equal amount of spent liquid therefrom.]

5. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, means defining a first orifice in said first shell, a first conduit receiving fluid from said inlet line and flowing the fluid into said first orifice, said first conduit extending the length of the first shell and defining a fluid flow path through a first right angle turn, a reduced cross-sectional area and then a second right angle turn, means defining a second orifice, separate and apart from the first orifice, in said first shell for withdrawing fluid from said annular chamber, and a drainage line communicating with said second orifice and leading through one of said heads.

6. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, means defining a first orifice in said first shell, a first conduit receiving fluid from said inlet line and flowing the fluid into said first orifice, said first conduit extending the length of the first shell and defining a fluid flow path through a first right angle turn and through a reduced cross-sectional area, means defining a second orifice, separate and apart from the first orifice, in said first shell for withdrawing fluid from said annular chamber, and a drainage line communicating with said second orifice and leading through one of said heads.

7. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, a drainage line communicating with said second orifice means and leading through one of said heads, a stationary head closing each end of the first shell, and draw-off means mounted in each stationary head and withdrawing fluid from the space between each stationary head and the rotary head adjacent thereto.

8. A dryer drum comprising a first cylindrical shell, a second cylindrical shell receiving the first and closely spaced therefrom to define therewith an annular chamber, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, a drainage line communicating with said second orifice means and leading through one of said heads, a stationary head closing each end of the first shell, draw-off means mounted in each stationary head and withdrawing fluid from the space between each stationary head and the rotary head adjacent thereto, and valve means in said draw-off means controlling the flow of fluid therethrough and thereby controlling the temperature of the heads.

*9. A method of heating a rotating dryer drum shell, which comprises confining a continuous unimpeded annular body of uniform depth of non-volatile heat exchange liquid between the inside of the shell and a closely spaced stationary surface to effect turbulence in the liquid flowing annularly at a given rate in an unimpeded flow, forcing hot liquid into said body on the inner surface thereof in a thin layer immediately adjacent said stationary surface only at a predetermined rate that is less than one half of said given rate and withdrawing spent liquid therefrom at a rate equal to said predetermined rate whereby heat energy losses through the shell are replaced by hot liquid constantly creating a substantial temperature differential in a radial direction but without creating a substantial temperature differential circumferentially around the outer surface of the liquid or on the shell.*

*10. A method as claimed in claim 9 wherein the hot liquid temperature is not less than 50° higher than said body temperature.*

*11. A method of heating a rotating dryer drum shell which comprises confining a uniform continuous depth annular body of non-volatile heat exchange liquid between the inside of the shell and a closely spaced stationary surface to effect turbulence in the liquid flowing annularly at about 250 cubic feet per minute, forcing hot liquid into said body on the radial inner surface thereof only at a temperature 50° F. above that of said body and at a rate of about 13.6 cubic feet per minute and withdrawing spent liquid therefrom at substantially said rate so that the hot liquid does not immediately penetrate to the outer surface of the annular body and B.t.u. losses through the shell are replaced without creating a substantial temperature differential at the outer surface of the body of the liquid and on the surface of the shell.*

*12. A dryer drum comprising a first cylindrical shell having an uninterrupted annular inner surface, a second cylindrical shell receiving the first and closely spaced therefrom having an uninterrupted annular outer surface to define with the inner surface of the first shell a continuous uninterrupted annular chamber of uniform depth, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber at a temperature substantially higher than the temperature of the fluid in the chamber and at a relatively lower rate than the circulation of the liquid in the chamber adjacent the outer shell, second orifice means separate and apart from the first orifice means, in said first shell for withdrawing fluid from said annular chamber, and a drainage line communicating with said second orifice means and leading through one of said heads, said first and second orifice means being substantially diametrically opposed.*

*13. A dryer drum comprising a first cylindrical shell, a second cylindrical shell receiving the first and closely spaced therefrom to define therewith a continuous uninterrupted annular chamber of uniform size, a head closing each end of the second shell, means corotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, at a temperature substantially higher than the temperature of the fluid in the chamber and at a relatively lower rate than the circulation of the liquid in the chamber adjacent the outer shell, second orifice means, separate and apart from the first orifice means, in said first shell for withdrawing fluid from said annular chamber, and a drainage line communicating with said second orifice means and leading through one of said heads, said first and second orifice means being angularly spaced from each other a substantial distance.*

References Cited by the Examiner

The following references, cited by the Examiner, are of record in the patented file of this patent or the original patent.

UNITED STATES PATENTS

| | | | |
|---|---|---|---|
| 51,084 | 11/1865 | Quick. | |
| 630,727 | 8/1899 | Muller | 165—90 |
| 3,022,047 | 2/1962 | Swaney | 165—107 |

FOREIGN PATENTS

| | | |
|---|---|---|
| 613,662 | 5/1935 | Germany. |

JAMES W. WESTHAVER, *Primary Examiner.*

HERBERT L. MARTIN, PERCY L. PATRICK, CHARLES SUKALO, *Examiners.*